United States Patent
Eaton et al.

(10) Patent No.: US 11,953,374 B2
(45) Date of Patent: Apr. 9, 2024

(54) ELECTRONIC DEVICES WITH AMBIENT LIGHT SENSOR RADIO-FREQUENCY INTERFERENCE CORRECTION

(71) Applicant: Apple Inc., Cupertino, CA (US)

(72) Inventors: Michael D Eaton, Menlo Park, CA (US); Anand K Chamakura, San Jose, CA (US); Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/162,393

(22) Filed: Jan. 31, 2023

(65) Prior Publication Data

US 2023/0288252 A1 Sep. 14, 2023

Related U.S. Application Data

(60) Provisional application No. 63/319,694, filed on Mar. 14, 2022.

(51) Int. Cl.
*G09G 3/20* (2006.01)
*G01J 1/42* (2006.01)
*G01J 1/44* (2006.01)

(52) U.S. Cl.
CPC .............. *G01J 1/44* (2013.01); *G01J 1/4204* (2013.01); *G09G 3/20* (2013.01); *G01J 2001/444* (2013.01); *G09G 2320/0626* (2013.01); *G09G 2330/06* (2013.01); *G09G 2360/144* (2013.01)

(58) Field of Classification Search
CPC ...... G01J 1/44; G01J 1/4204; G01J 2001/444; G09G 3/20; G09G 2320/0626; G09G 2330/06; G09G 2360/144; G09G 2310/08
See application file for complete search history.

(56) References Cited

U.S. PATENT DOCUMENTS

| 10,113,903 | B1 | 10/2018 | Patil et al. | |
| 2010/0001978 | A1* | 1/2010 | Lynch | G06F 3/042 |
| | | | | 345/175 |
| 2012/0132809 | A1 | 5/2012 | Findlay | |
| 2016/0174388 | A1* | 6/2016 | Bartley | H05K 1/0275 |
| | | | | 29/593 |

FOREIGN PATENT DOCUMENTS

CN 112710383 A 4/2021

* cited by examiner

*Primary Examiner* — Adam R. Giesy
(74) *Attorney, Agent, or Firm* — Treyz Law Group, P.C.; David K. Cole

(57) ABSTRACT

An electronic device may have an ambient light sensor for gathering ambient light measurements. The ambient light sensor may include multiple channels for measuring different wavelengths of ambient light. An additional, modified, channel may be formed in the ambient light sensor to measure radio-frequency signals that may interfere with the ambient light measurements due to electromagnetic interference. Alternatively, circuitry separate from the ambient light sensor, such as an antenna, may measure the radio-frequency signals. If the radio-frequency signals exceed a threshold, the ambient light sensor measurements taken in the presence of the radio-frequency signals may be discarded or corrected. If the radio-frequency signals do not exceed a threshold, the ambient light sensor measurements may be kept. Therefore, the ambient light measurements that are kept and relied upon by the electronic device may be free from electromagnetic interference.

24 Claims, 13 Drawing Sheets

ELECTRONIC DEVICES WITH AMBIENT LIGHT SENSOR RADIO-FREQUENCY INTERFERENCE CORRECTION

This application claims the benefit of U.S. provisional patent application No. 63/319,694, filed Mar. 14, 2022, which is hereby incorporated by reference herein in its entirety.

FIELD

This relates generally to electronic devices, and, more particularly, to electronic devices with light sensors.

BACKGROUND

Electronic devices such as laptop computers, cellular telephones, and other equipment are sometimes provided with light sensors. For example, ambient light sensors may be incorporated into a device to provide the device with information on current lighting conditions. It can be challenging to incorporate ambient light sensors into electronic devices. If care is not taken, electromagnetic interference may inhibit the accuracy of ambient light sensor measurements.

SUMMARY

An electronic device may have an ambient light sensor for gathering ambient light measurements. The electronic device may also include a display formed from an array of pixels. The ambient light sensor may be located under the array of pixels, or in a border region adjacent to the display.

The ambient light sensor may include multiple channels for measuring different wavelengths of ambient light. In particular, the ambient light sensor may include multiple photodiodes overlapped by different colored filters to generate charge in response to desired wavelengths of light. Once the charge is generated by the photodiodes, the charge may be amplified, filtered, and read out to processing circuitry in the electronic device.

An additional, modified, channel may be formed in the ambient light sensor to measure radio-frequency signals that may interfere with the ambient light measurements due to electromagnetic interference. Specifically, a channel with a photodiode covered by a filter layer (e.g., dark ink) may generate charge in response to radio-frequency signals but not to ambient light wavelengths, or a channel may be capable of sensing both ambient light and radio-frequency signals. As an alternative to having an additional channel in the ambient light sensor to measure radio-frequency signals, circuitry separate from the ambient light sensor, such as an antenna, may measure the radio-frequency signals.

If the radio-frequency signals exceed a threshold, control circuitry may take a corrective action by discarding or correcting the ambient light sensor measurements taken in the presence of the radio-frequency signals. If the radio-frequency signals do not exceed a threshold, the control circuitry may keep the ambient light sensor measurements. The control circuitry may then make adjustments to the electronic device, such as the display brightness or other settings, based on the ambient light measurements that are modified or are free from electromagnetic interference.

DETAILED DESCRIPTION

Figure 1:
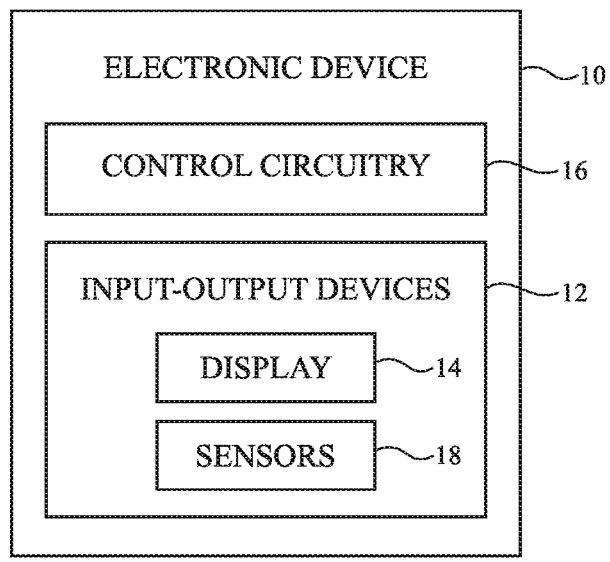
FIG. 1 is a schematic diagram of an illustrative electronic device having display and sensor components in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be include any desired display technology, and may be an organic light-emitting diode (OLED) display, a liquid crystal display (LCD), a microLED display, or any other desired type of display.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a radio-frequency sensor, a three-dimensional image sensor, a camera, a light-based position sensor (e.g., a lidar sensor), and other sensors. Sensors 18 may also include one or more light detectors that are configured to detect ambient light. Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (e.g., color spectrum, color temperature, color coordinates, etc.) of ambient light and may be used to measure ambient light intensity.

Electronic device 10 may include one or more ambient light sensors. Illustrative arrangements in which device 10 includes a single ambient light sensor are sometimes described herein as an example. In some configurations, the ambient light sensor may be located in a portion of device 10 where there is a potential for light interference from light-emitting components in device 10 that emit stray light. For example, the ambient light sensor may be overlapped by a pixel array in display 14 (e.g., an active area of the display that is configured to display images) that has a potential to generate stray light. The pixel array may have transparent portions (e.g., transparent gaps between metal traces and other opaque structures) or may have a window opening so that ambient light may pass through the pixel array to the overlapped ambient light sensor. By locating the ambient light sensor behind the active area of the display, the appearance of device 10 may be enhanced and/or more area can be freed up for other components and functions. Configurations in which the ambient light sensor is located under an inactive display area (e.g., a notch or pixel array window opening that is free of pixels) or is located elsewhere within device 10 may also be used.

During operation, control circuitry 16 may gather measurements with the ambient light sensor while controlling display 14 or other light source that generates stray light. Control circuitry 16 may then process the data gathered from the ambient light sensor to produce accurate ambient light measurements even in scenarios in which sensor data has been gathered in the presence of electromagnetic interference. For example, device 10 may include communications circuitry, including wireless transceiver circuitry, which may emit radio-frequency signals. Additionally or alternatively, device 10 may operate in environments in which there are ambient radio-frequency signals (e.g., radio-frequency signals that are emitted by other devices). These radio-frequency signals may cause electromagnetic interference with ambient light sensors in device 10.

Figure 2:
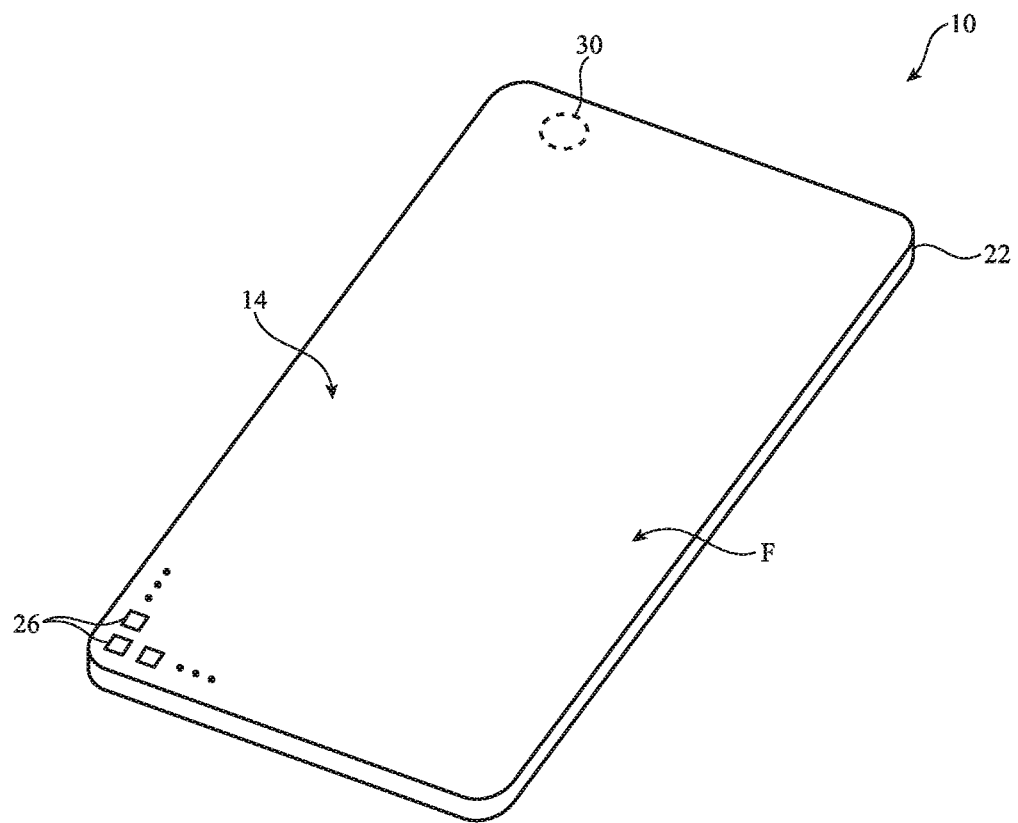
FIG. 2 is a perspective view of an electronic device with an ambient light sensor in accordance with an embodiment.

A perspective view of an illustrative electronic device of the type that may include an ambient light sensor is shown in FIG. 2. In the example of FIG. 2, device 10 includes a display such as display 14 mounted in housing 22. Display 14 may be a liquid crystal display, an electrophoretic display, an organic light-emitting diode display, or other display with an array of light-emitting diodes (e.g., a display that includes pixels having diodes formed from crystalline semiconductor dies), may be a plasma display, may be an electrowetting display, may be a display based on microelectromechanical systems (MEMs) pixels, or may be any other suitable display. Display 14 may have an array of pixels 26 that extends across some or all of front face F of device 10 and/or other external device surfaces. The pixel array may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of pixels 26.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 and display 14 may separate an interior region of device 10 from an exterior region surrounding device 10. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a wristband or other strap may be coupled to a main portion of housing 22 (e.g., in configurations in which device 10 is a wristwatch).

Pixels 26 may cover substantially all of the front face of device 10 or display 14 may have inactive areas (e.g., notches, recessed areas, rectangular areas, or other regions) that are free of pixels 26. The inactive areas may be used to accommodate an opening for a speaker and windows for optical components such as one or more image sensors, ambient light sensors, optical proximity sensors, three-dimensional image sensors such as structured light three-dimensional image sensors, and/or a camera flash, etc. In an illustrative configuration, pixels 26 may extend over the entirety of the front surface F of device 10 and may overlap an ambient light sensor in region 30. In this type of arrangement, ambient light may pass to the ambient light sensor in region 30 through the array of pixels 26 in display 14.

Figure 3:
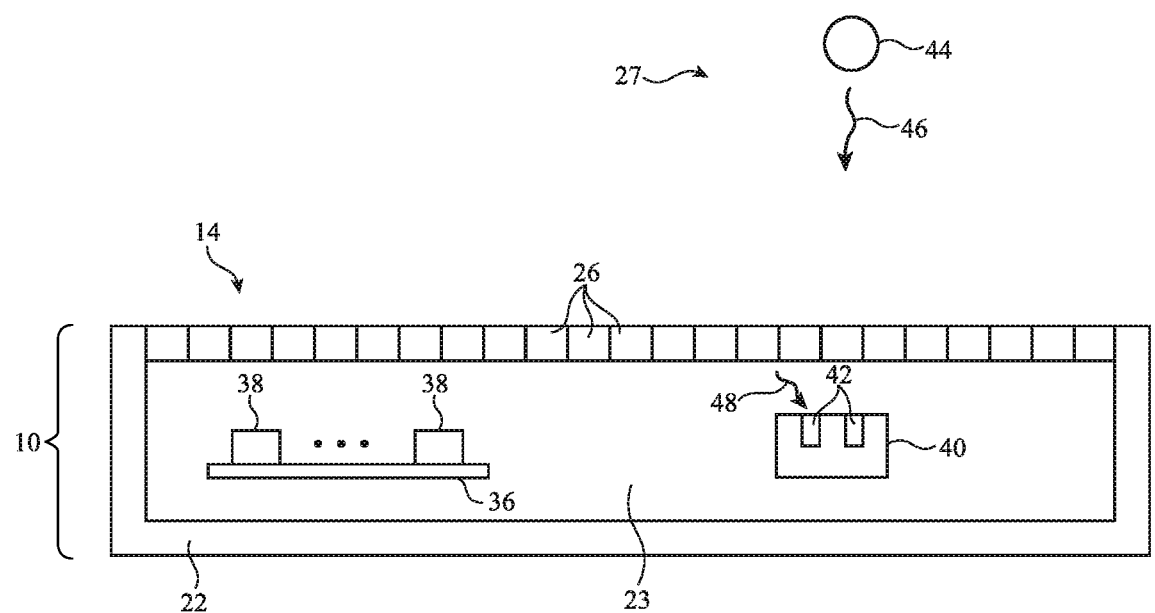
FIG. 3 is a side view of an illustrative interior of an electronic device with a display and an ambient light sensor in accordance with an embodiment.

FIG. 3 is a side view of device 10 of FIG. 2 in an illustrative configuration in which pixels 26 overlap ambient light sensor 40. As shown in FIG. 3, ambient light sensor 40 may have one or more photodetectors 42. A single photodetector 42 (or set of photodetectors 42) may be used to make monochromatic light measurements (e.g., measurements of light intensity) or a set of photodetectors 42 that have color filters of different respective colors may be used to make intensity and color measurements on ambient light 46. Ambient light sensor 40 may be mounted in interior region 23 of housing 22 under display 14. Display 14 and housing 22 may separate interior region 23 from exterior region 27 surrounding device 10. Electrical components 38 (see, e.g., control circuitry 16 and input-output devices 12 of FIG. 1) may be mounted within interior region 23 (e.g., on one or more printed circuits such as printed circuit 36).

Display 14 has an array of pixels 26. Pixels 26 extend over front face F of device 10 and form an active area for display 14 in which images are displayed. A display cover layer (e.g., a layer of glass, crystalline material such as sapphire, polymer, etc.) may at least partially cover and overlap pixels 26. Each pixel 26 may be formed from thin-film transistors and other components (e.g., liquid crystal display pixel components such as pixel electrodes, light-emitting diode pixel components such as light-emitting diodes, etc.). Metal traces and other opaque structures in pixels 26 may block light; however, the array of pixels 26 may also include transparent regions between the opaque structures. The presence of transparent areas in display 14 allows ambient light 46 from external light sources such as external light source 44 in exterior region 27 to pass through the array of pixels 26 to reach ambient light sensor 40 in interior region 23. Window openings, notches, and other structures may also be formed in display 14 to allow ambient light to pass to ambient light sensor 40.

As the example of FIG. 3 demonstrates, ambient light sensor 40 may, in some configurations, be mounted under display 14. In this location within interior region 23 of housing 22, the active area of display 14 that is formed by pixels 26 overlaps ambient light sensor 40 when viewed from the exterior of device 10 (e.g., when viewing front face F). By mounting ambient light sensor 40 behind pixels 26 in this way, the overall size of device 10 may be reduced, the appearance of device 10 may be enhanced, and inactive display area may be reduced. If desired, ambient light sensor 40 may be located adjacent to display 14 without receiving ambient light through display 14 (e.g., ambient light sensor 40 may be near display 14 but not overlapped by pixels 26). Arrangements in which ambient light sensor 40 receives ambient light through an overlapping display may sometimes be described as an example. Additionally, although a single ambient light sensor 40 is shown in FIG. 3, this is merely illustrative. In general, device 10 may include multiple ambient light sensors 40 under display 14, adjacent to display 14, on the rear of device 10, and/or any other location in device 10.

During operation of display 14 to display an image for a user, pixels 26 of display 14 may emit light such as stray display light 48. Some of light 48 from display 14 may pass through interior region 23 to ambient light sensor 40 or may otherwise reach ambient light sensor 40. This stray light therefore represents a source of noise that has the potential to interfere with accurate measurements of ambient light 46 by ambient light sensor 40. Stray light also represents a source of noise in configurations in which display 14 and ambient light sensor are located near to each other but do not overlap.

Control circuitry 16 may gather measurements with ambient light sensor 40 while controlling display 14. In this way, control circuitry 16 can help discriminate between contributions to ambient light sensor measurements from sensor 40 that are due to ambient light 46 and contributions to the ambient light sensor measurements from sensor 40 that are due to display light 48. In one suitable arrangement, control circuitry 16 may intermittently turn off the display during emission blanking intervals, and ambient light sensor 40 may then be used to measure ambient light during the emission blanking intervals while the display is temporarily deactivated. Since the display does not emit light during the emission blanking intervals, ambient light measurements obtained by ambient light sensor 40 in this way will be free of noise and crosstalk that would otherwise be present due to stray light emitted from the display. However, this is merely illustrative. Control circuitry 16 may gather at least some measurements while display 14 is emitting light with pixels 26, if desired.

Figure 4:
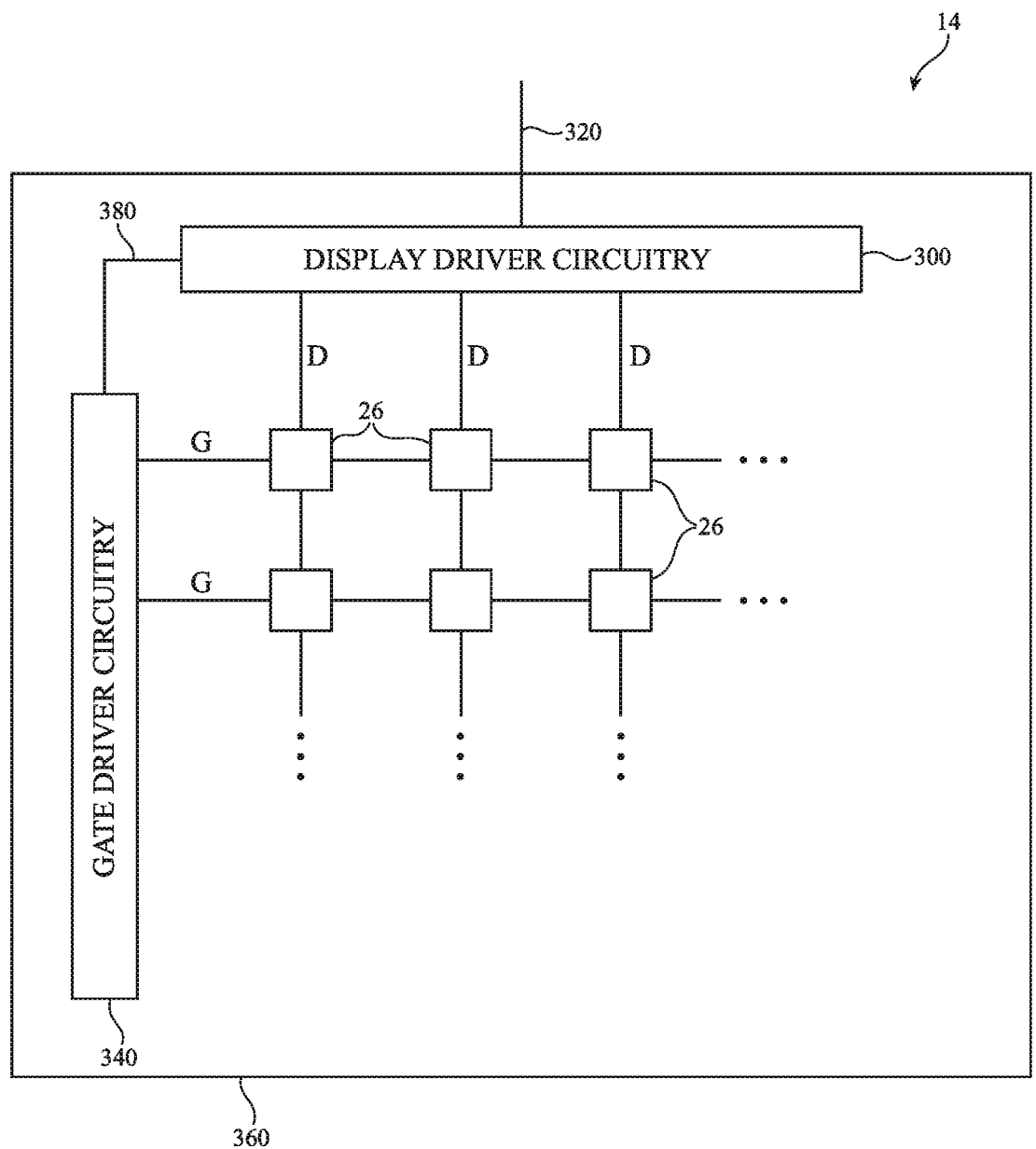
FIG. 4 is a diagram of an illustrative display with an array of display pixels in accordance with an embodiment.

A top view of a portion of display 14 is shown in FIG. 4. Display 14 may have a rectangular shape (i.e., display 14 may have a rectangular footprint and a rectangular peripheral edge that runs around the rectangular footprint) or may have other suitable shapes. Display 14 may be planar or may have a curved profile. As shown in FIG. 4, display 14 may have an array of display pixels 26 formed on a substrate 360. Substrate 360 may be formed from glass, metal, plastic, ceramic, porcelain, or other substrate materials. Pixels 26 may receive data signals over signal paths such as data lines D and may receive one or more control signals over control signal paths such as horizontal control lines G (sometimes referred to as gate lines, scan lines, emission lines, etc.). There may be any suitable number of rows and columns of pixels 26 in display 14 (e.g., tens, hundreds, or thousands of pixels 26). Pixels 26 may be implemented using any suitable type of display technology (e.g., using organic light-emitting diode display technology, liquid crystal display technology, electrophoretic display technology, plasma display technology, electrowetting display technology, MEMs display technology, etc.).

Display driver circuitry 300 may be used to control the operation of pixels 26. The display driver circuitry 300 may be formed from integrated circuits, thin-film transistor circuits, or other suitable electronic circuitry. Display driver circuitry 300 of FIG. 4 may contain communications circuitry for communicating with system control circuitry such as control circuitry 16 of FIG. 1 over path 320. Path 320 may be formed from traces on a flexible printed circuit or other cable. During operation, the control circuitry (e.g., control circuitry 16 of FIG. 1) may supply circuitry 300 with information on images to be displayed on display 14.

To display the images on display pixels 26, display driver circuitry 300 may supply image data to data lines D (e.g., data lines that run down the columns of pixels 22) while issuing clock signals and other control signals to supporting display driver circuitry such as gate driver circuitry 340 over path 380. If desired, display driver circuitry 300 may also supply clock signals and other control signals to gate driver circuitry 340 on a different edge of display 14 (e.g., the gate driver circuitry may be formed on more than one side of the display pixel array).

Gate driver circuitry 340 (sometimes referred to as horizontal line control circuitry or row driver circuitry) may be implemented as part of an integrated circuit and/or may be implemented using thin-film transistor circuitry. Horizontal/row control lines G in display 14 may carry gate line signals, scan line control signals, emission enable control signals, and/or other horizontal control signals for controlling the pixels in each row. There may be any suitable number of horizontal control signals per row of pixels 26 (e.g., one or more row control lines, two or more row control lines, three or more row control lines, four or more row control lines, five or more row control lines, etc.).

Figure 5A:
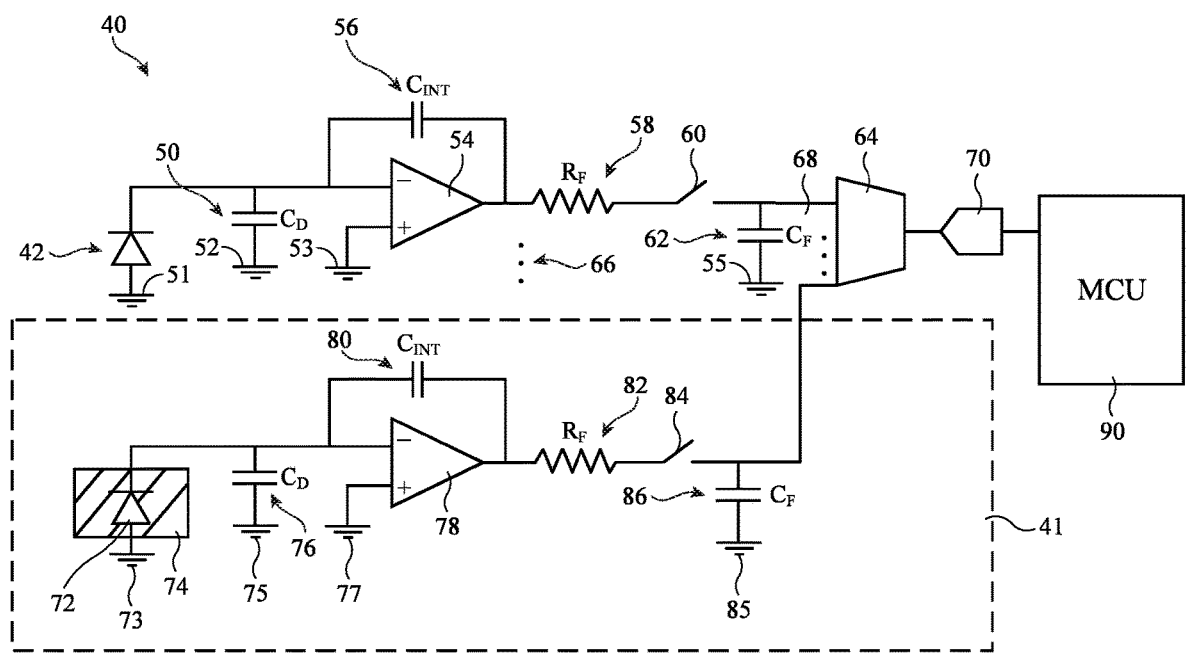
FIG. 5A is a circuit diagram of an illustrative ambient light sensor having at least one ambient light measurement channel and an electromagnetic interference measurement channel coupled to control circuitry in accordance with an embodiment.

FIG. 5A is a circuit diagram of an ambient light sensor that may be included under display 14, adjacent to display 14, or elsewhere in device 10 and used to perform ambient light sensing (may be referred to as ambient light sensor 40 herein). For example, if ambient light sensor 40 is included under display 14, in non-blanking periods when the display is on, ambient light sensor 40 may be in a "hold" or idle state. During blanking periods when the display is off, ambient light sensor 40 may switched into use to integrate charge. This type of ambient light sensing operation is sometimes referred to as having "hold function" capability. If desired, however, ambient light sensor 40 may be switched into use to integrate charge during at least some periods in which display 14 is on.

As shown in FIG. 5A, ambient light sensor 40 may include photodiode 42 coupled between ground line 51 and the negative (−) input port of amplifier 54. Capacitor $C_D$ 50 may be coupled between the line coupled to the negative input port of amplifier 54 and ground line 52. The positive (+) input port of amplifier 54 may be coupled to ground line 53, and the output of amplifier 54 may be coupled to both capacitor $C_{INT}$ 56 (which is in turn coupled to the negative input port of amplifier 54), and to filter resistor $R_F$ 58. Resistor 58 is coupled to switch 60 and capacitor $C_F$ 62 (which is in turn coupled to ground line 55). Together, switch 60 and capacitor 62 may form sample-and-hold circuitry, the output of which is read out to multiplexer (MUX) 64.

As indicated by ellipses 66, ambient light sensor 40 may have any desired number of photodiodes 42 (and corresponding capacitors, amplifiers, resistors, and switches). Together, each photodiode 42, capacitor 50, amplifier 54, capacitor 56, resistor 58, switch 60, and capacitor 62 may form an ambient light sensor channel.

Ambient light sensor 40 may include any desired number of ambient light sensor channels. For example, ambient light sensor 40 may include different channels with different overlying filters (i.e., different filters over photodiodes 42) to sense the color of ambient light. Ambient light sensor 40 may include two or more, three or more, five or more, six or less, or any other desired number of ambient light sensor channels. Each ambient light sensor channel may have output line 68 coupled to multiplexer (MUX) 64, which may be in turn coupled to analog-to-digital convertor (ADC) 70. ADC 70 may comprise one or more ADC circuits that convert the analog signals produced by photodiodes 42 into digital signals. The output of ADC 70 may then be coupled to micro-controller unit (MCU) 90. MCU 90 may be a portion of control circuitry 16 or may be a standalone micro-controller, as examples.

Regardless of the number of ambient light sensor channels in ambient light sensor 40, ambient light sensor 40 may also include radio-frequency (RF) measurement circuitry 41. As shown in FIG. 5A, RF measurement circuitry 41 may be formed as an additional channel in ambient light sensor 40 and may have a similar architecture to the ambient light sensor channels discussed previously. In particular, RF measurement circuitry 41 may include photodiode 72 coupled between ground line 73 and the negative (−) input port of amplifier 78. Capacitor $C_D$ 76 may be coupled between the line coupled to the negative input port of amplifier 78 and ground line 73. The positive (+) input port of amplifier 78 may be coupled to ground line 77, and the output of amplifier 78 may be coupled to both capacitor $C_{INT}$ 80 (which is in turn coupled to the negative input port of amplifier 78, and to filter resistor $R_F$ 82. Resistor 82 is coupled to switch 84 and capacitor $C_F$ 86 (which is in turn coupled to ground line 85). Together, switch 84 and capacitor 86 may form sample-and-hold circuitry. The output of the sample-and-hold circuitry may be coupled to MUX 64, which may in turn be coupled to ADC 70 to convert the output to digital signals. The digital signals may then be output to MCU 90.

As opposed to the ambient light sensor channels, which include photodiodes 42 that are sensitive to specific wavelengths of light, RF circuitry 41 may be modified to be sensitive to radio-frequency signals that cause electromagnetic interference (EMI) that may reduce the accuracy of measurements generated by ambient light sensor 40. Specifically, layer 74 may overlap photodiode 72 in RF circuitry 41. Layer 74 may be any desired material, such as metal, a filter layer (e.g., a layer formed from one or more thin-film interference layers, band-stop filter layers, band-pass filter layers, or any other desired filter layer), ink layer, or any other desired layer. In general, layer 74 may block light from reaching photodiode 72. In this way, photodiode 72 may generate signals in response to RF signals that cause EMI.

In operation, photodiode 42 may generate charge in response to incident light. That charge may be transferred to capacitor $C_D$ and provided to amplifier 54. Amplifier 54 (which is coupled to capacitor $C_{INT}$ to ensure proper amplification of the charge) may amplify the charge before it reaches filter resister $R_F$. Filter resister $R_F$ may prevent charge below a certain threshold (after amplification) from proceeding. Switch 60 and capacitor $C_F$ may hold the charge until it is time to read out the charge for the given channel over line 68 to MUX 64 before it is converted into a digital signal by ADC 70 for processing by MCU 90 and other control circuitry.

Each parallel channel in ambient light sensor 40 may operate substantively the same way, generating charge in response to ambient light, amplifying the charge, and reading out the charge to MCU 90 as a digital signal.

Additionally, RF circuitry 41 may operate similarly to the other channels, with the exception of generating charge in response to radio-frequency signals, due to the presence of layer 74 over photodiode 74. However, once the charge has been generated, it, too, is amplified, read out, and converted to a digital signal to be processed by MCU 90.

After MCU 90 receives the digital signals from ADC circuitry 70, MCU 90 may compare the signal generated by RF circuitry 41 to a threshold value (also referred to as a threshold herein). The threshold value may be set based on the sensitivity of ambient light sensor 40 to RF signals, and may be set at manufacturing, or through an update to the software or firmware of device 10.

If the signal generated by RF circuitry 41 exceeds the threshold value, then the EMI present when the ambient light sensor channels performed the ambient light measurements may have rendered those measurements inaccurate. MCU 90 may therefore take a corrective action. The corrective action may include discarding any ambient light sensor measurements taken when the signal generated by RF circuitry 41 exceeds the threshold value.

Alternatively, the signals generated by RF circuitry 41 may indicate the extent to which the ambient light sensor measurements have been rendered inaccurate. In other words, the amount of RF interference present when the ambient light sensor measurements are made may be proportional or otherwise related to the amount by which the measurements are inaccurate. Therefore, if desired, MCU 90 may correct the ambient light sensor measurements based on an amount by which the RF signals exceed the threshold value. In this way, corrected ambient light sensor measurements may be produced by MCU 90, which may in turn be used by control circuitry as desired (e.g., changing settings of the electronic device or performing another desired function).

If the signal generated by RF circuitry 41 does not exceed the threshold value, MCU 90 may keep the ambient light measurements, which in turn may be used by control circuitry as desired (e.g., changing settings of the electronic device or performing another desired function).

Figure 5B:
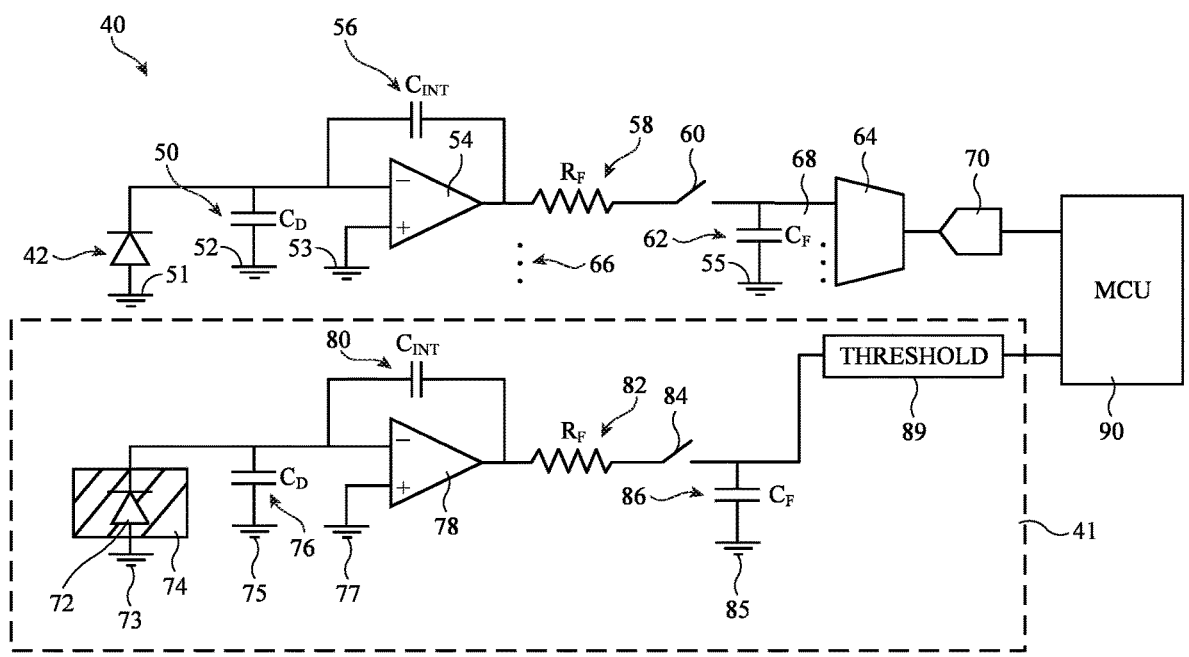
FIG. 5B is a circuit diagram of an illustrative ambient light sensor having at least one ambient light measurement channel and an electromagnetic interference measurement channel coupled to a threshold device in accordance with an embodiment.

The example of FIG. 5A in which RF circuitry 41 generates an analog signal which is converted to a digital signal by ADC 70 prior to reaching MCU 90 is merely illustrative. For example, as shown in FIG. 5B, threshold circuitry 89 may be included in RF circuitry 41 to determine whether the analog value generated by photodiode 72 and amplified by amplifier 78 exceeds a threshold value indicating that the EMI interfered with the ambient light measurements. If the analog signal exceeds the threshold value, threshold circuitry 89 may send a signal to MCU 90 to take a corrective action by discarding or correcting the corresponding ambient light measurements. In general, however, any desired method may be used to convert the signal generated by photodiode 72 to a digital signal and/or compare the analog or digital signal to the threshold value. In this way, MCU 90 may discard or correct ambient light sensor data that has been compromised by electromagnetic interference.

Figure 6:
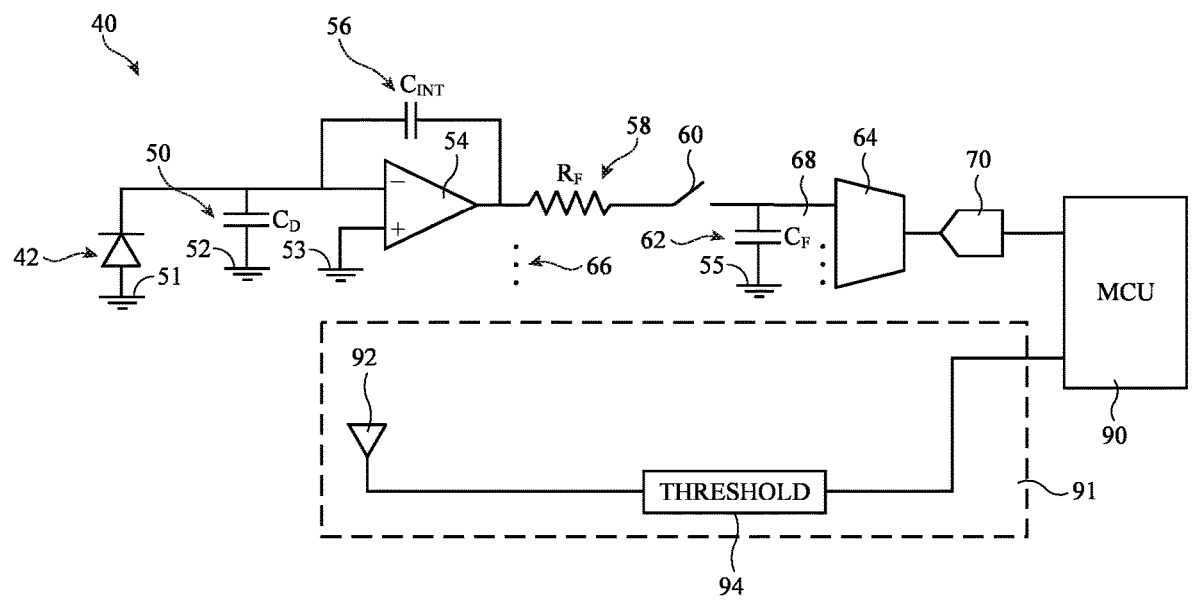
FIG. 6 is a circuit diagram of an illustrative ambient light sensor and a radio-frequency measurement circuit in accordance with an embodiment.

Although FIGS. 5A and 5B show RF circuitry 41 in ambient light sensor 40, this is merely illustrative. RF circuitry may be anywhere in device 10. As shown in FIG. 6, RF circuitry 91 may be formed separate from ambient light sensor 40. Although RF circuitry 91 may be formed from a covered photodiode and corresponding amplifier, filtering, and sample-and-hold circuitry (i.e., with the same architecture shown in FIG. 5A or 5B), FIG. 6 illustrates that RF circuitry 91 may be formed from antenna 92 and threshold circuitry 94. In particular, antenna 92 may be used to detect radio-frequency signals that may cause electromagnetic interference. For example, antenna 92 may be a coil antenna, a patch antenna, an inverted-F antenna, or any other desired antenna. In general, antenna 92 may be any antenna to detect RF signals that may interfere with the operation of ambient light sensor 40. After RF signals are detected by antenna 92, threshold circuitry 94 may be used to determine whether the RF signals exceed a threshold (i.e., to determine whether the RF signals will interfere with the accuracy or functionality of ambient light sensor 40). Threshold circuitry 94 may be coupled to MCU 90, which in turn may take a corrective action by discarding or correcting the ambient light measurements made by ambient light sensor 40 if the RF signals exceed the threshold, or may retain the ambient light measurements made by ambient light sensor 40 if the RF signals are below the threshold. This determination by MCU 90 may be performed using the same method as described above in connection with FIGS. 5A and 5B.

Although FIGS. 5B and 6 shows threshold circuitry 94 in RF circuitry 91, this is merely illustrative. If desired, threshold circuitry 94 may be formed external to RF circuitry 91, may be formed within MCU 90, or anywhere else in device 10. Alternatively, RF circuitry 91 may include an ADC between antenna 92 and MCU 90, if desired.

Moreover, although FIG. 6 shows RF circuitry 91 being separate from ambient light sensor 40, RF circuitry 91 with antenna 92 may be formed within ambient light sensor 40, if desired. In general, antenna 92 and RF circuitry 91 may be formed anywhere within device 10. For example, antenna 92 may be an antenna used for the reception of other signals within device 10 (e.g., a non-dedicated antenna). Alternatively or additionally to the embodiments in FIGS. 5A, 5B, and 6, MCU 90 may receive input from other control circuitry, such as control circuitry 16 in FIG. 1, indicating that an internal component within device 10 is emitting radio-frequency signals. MCU 90 may then take a corrective action by discarding or correcting ambient light measurements made by ambient light sensor 40 during the time RF signals are being emitted.

Although FIGS. 5 and 6 respectively show a single photodiode and single antenna used in RF measurement circuitry, this is merely illustrative. Multiple photodiodes and/or antennas may be used in RF measurement circuitry 41 or 91, as desired.

Regardless of the architecture used to form the RF circuitry, ambient light sensor 40 may be operated in tandem with display 14 to reduce additional interference from light produced by display 14. A timing diagram for operating ambient light sensor 40 is shown in FIG. 7A.

Figure 7A:
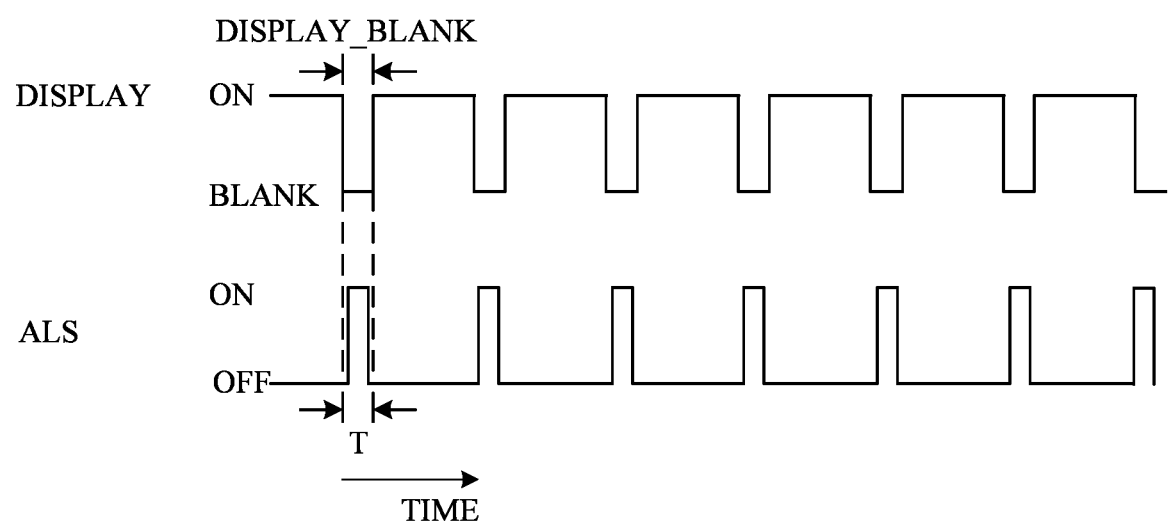
FIG. 7A is an illustrative timing diagram of operating an ambient light sensor while a display is blanked in accordance with an embodiment.

As shown in FIG. 7A, the display, such as display 14 of FIG. 2, may have regular intervals in which the display is blanked (i.e., when the pixels in display 14 are not emitting light to display images to a user of device 10). These intervals are shown in FIG. 7A as DISPLAY_BLANK, and may be referred to as a "blanking times" herein (periods in which the display is displaying images may be referred to as "non-blanking times" herein). For example, DISPLAY_BLANK may have a duration of 450 μs to 550 μs, less than 600 μs, less than 500 μs, greater than 450 μs, or any other desired duration.

An ambient light sensor, such as ALS 40, may be activated to make a measurement of ambient light (i.e., be "ON" in FIG. 7A), during time T. As shown in FIG. 7A, time T may be less than the DISPLAY_BLANK duration. For example, ALS 40 may be on (i.e., integrate) for 450 μs, less than 500 μs, 400 μs or less, or any other time T. Before and after time T, ALS 40 may be on "hold" or in an idle state (i.e., ALS 40 may not be generating ambient light measurements during this time). In this way, ALS 40 may integrate while display 14 is blanked, thereby reducing interference from the light emitted by display 14.

The short integration time of ALS 40 may allow for the discarding of ambient light sensor measurements, if desired (e.g., when RF circuitry 41 detects RF signals that could cause EMI), without the loss of a substantial amount of ALS sensor measurements. For example, if one of the ALS measurements in FIG. 7A occurs at the same time as RF circuitry 41 detects RF signals, processing circuitry or control circuitry, such as MCU 90, may discard that ALS measurement. However, in the FIG. 7A example, there would still be six ambient light measurements that are not discarded. In this way, control circuitry in device 10 may discard compromised ALS measurements, while maintaining sufficient ALS data to make corresponding adjustments to components within device 10.

Instead of activating ALS 40 only during the blanking time, the integration time of ALS 40 may be varied depending on the environmental conditions of device 10. An example of a varied integration time for ALS 40 is shown in FIG. 7B.

Figure 7B:
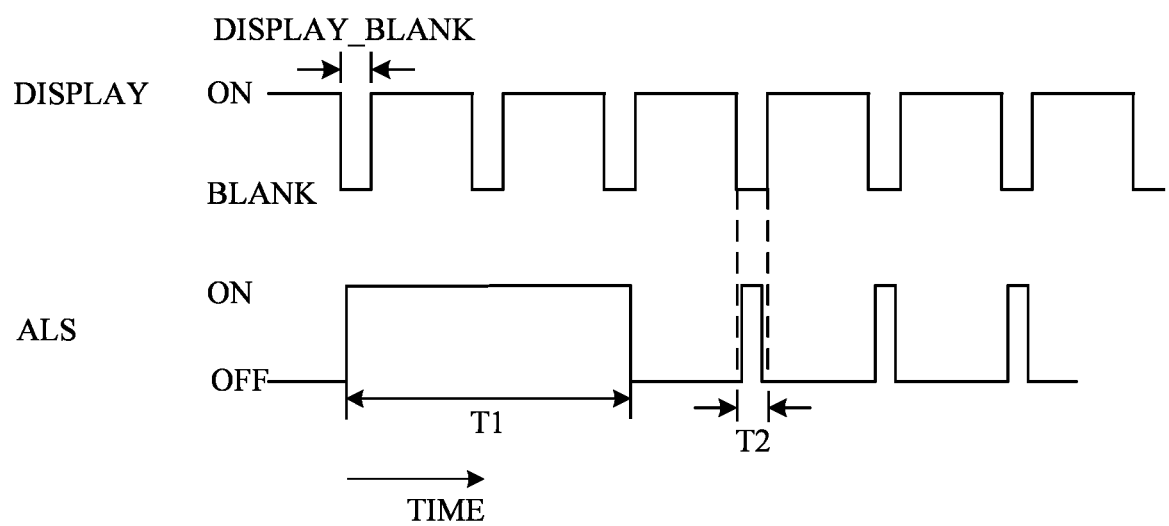
FIG. 7B is an illustrative timing diagram of adjusting the integration time of an ambient light sensor in accordance with an embodiment.

As shown in FIG. 7B, the display blanking duration DISPLAY_BLANK may be the same as in FIG. 7A. For example, DISPLAY_BLANK may have a duration of 450 µs to 550 µs, less than 600 µs, less than 500 µs, greater than 450 µs, or any other desired duration. However, ALS 40 may be on at a first time period $T_1$, which is longer than display blanking duration DISPLAY_BLANK. For example, first time period $T_1$ may be 50 ms, less than 100 ms, less than 75 ms, greater than 40 ms, or any other desired duration.

If RF signals are sensed (e.g., by RF circuitry 41 or 91), then control circuitry may shorten the integration time of ALS 40 to $T_2$, which is shorter than the blanking duration DISPLAY_BLANK. For example, $T_2$ may be 450 µs, 400 µs or less, or any other duration. By adjusting the ALS integration time to be shorter than the display blanking duration once RF signals are detected, any ambient light measurements that are discarded (e.g., because they occur while RF signals are detected) are shorter in duration. There will therefore be more ambient light measurements that are not discarded, allowing control circuitry in device 10 to make any necessary adjustments based on those measurements.

Although FIGS. 5-7 have shown and described using dedicated RF measurement circuitry (e.g., RF measurement circuitry 41 of FIG. 5 or RF measurement circuitry 91 of FIG. 6), this is merely illustrative. In some embodiments, one or more ambient light sensor channels in an ambient light sensor may be used both for ambient light sensing and for RF sensing. An illustrative example of an ambient light sensor having a channel that can detect ambient light and RF signals is shown in FIG. 8.

Figure 8:
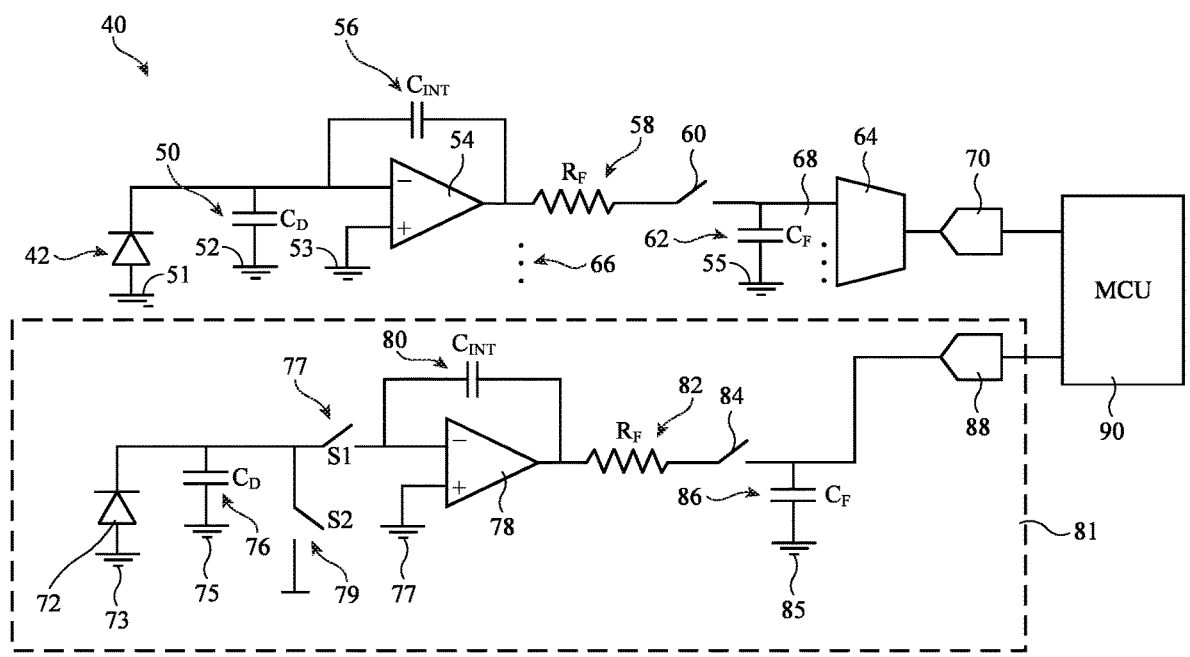
FIG. 8 is a circuit diagram of an illustrative ambient light sensor having at least one ambient light measurement channel and a dual ambient light sensing and radio-frequency signal sensing channel coupled to control circuitry in accordance with an embodiment.

As shown in FIG. 8, an ambient light sensor, such as ambient light sensor 40, may include any desired number of ambient light sensor channels. Each ambient light sensor channel may include photodiode 42, capacitor 50, amplifier 54, capacitor 56, resistor 58, switch 60, and capacitor 62, if desired. The structure and function of each of the ambient light sensor channels may be the same or substantially similar to the ambient light sensor channels of FIGS. 5A, 5B, and 6.

In addition to the ambient light sensor channels, ambient light sensor 40 may have channel 81. Channel 81 may be a dual ambient light and RF sensing channel. For example, channel 81 may include all of the elements of the other ambient light sensor channels, including photodiode 72, capacitor 76, amplifier 78, capacitor 80, resistor 82, switch 84, and capacitor 86. When operated in an ambient-light-sensing mode, switch S1 may be closed and switch S2 may be open. In this configuration, channel 81 may have the same operation as the other ambient light sensor channels in ambient light sensor 40 (as well as the ambient light sensor channels described in connection with FIGS. 5A, 5B, and 6).

It may also be desirable to operate channel 81 in an RF-sensing mode. In the RF-sensing mode, switch S1 may be open and switch S2 may be closed. In this way, any current from photodiode 72 will not pass to amplifier 78. In this mode, the output of channel 81 should be zero (e.g., since there is no current passed to amplifier 78 and the sample and hold circuitry). However, if there are RF signals present, a non-zero reading may be produced. Therefore, a non-zero output from channel 81 may indicate the presence of RF signals, and any ambient light sensor signals collected in the presence of the RF signals may be discarded.

Using channel 81 for both ambient light sensing and RF sensing may reduce the footprint of ambient light sensor 40. In particular, control circuitry may modulate S1 and S2 to switch channel 81 between an ambient light sensing mode and an RF sensing mode. As a result, ambient light sensor 40 may have one less channel since channel 81 can detect both ambient light and RF signals. Moreover, functions that are already present for ambient light sensing may be used in detecting the RF signals. For example, an auto-zero function may be used to remove an internal offset in the integrator (amplifier 78 and capacitor 80) prior to ambient light sensing. The same auto-zero function may be used prior to RF sensing, and may function whenever photodiode 72 is connected and/or disconnected (e.g., whenever switches S1 and/or S2 is activated or deactivated), if desired.

Although ambient light sensor 40 is shown as having one dual ambient light and RF sensing channel 81, this is merely illustrative. Any number of channels in ambient light sensor 40 may perform both ambient light and RF sensing.

Channel 81 may operate in the ambient light sensing and RF sensing modes based on the current operation of device 10 (FIG. 2), such as based on the operation of display 14. An illustrative timing diagram for operating an ambient light sensor with a dual ambient light sensing and RF sensing channel is shown in FIG. 9.

Figure 9:
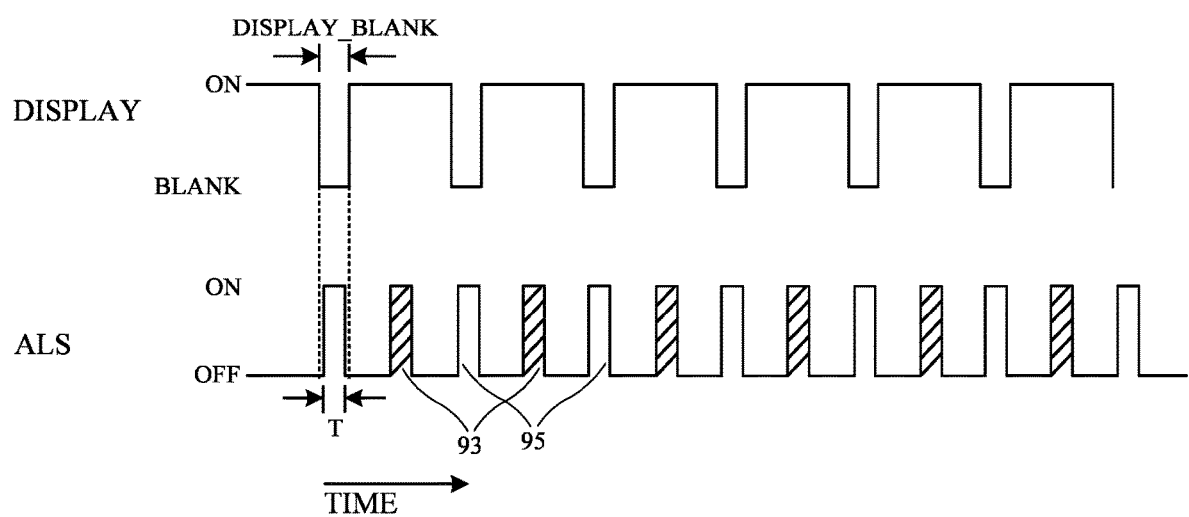
FIG. 9 is an illustrative timing diagram of operating an ambient light sensor with a dual ambient light sensing and radio-frequency signal sensing channel coupled to control circuitry in accordance with an embodiment.

As shown in FIG. 9, the display, such as display 14 of FIG. 2, may have regular intervals in which the display is blanked (i.e., when the pixels in display 14 are not emitting light to display images to a user of device 10). These intervals are shown in FIG. 9 as DISPLAY_BLANK, and may be referred to as a "blanking times" herein (periods in which the display is displaying images may be referred to as "non-blanking times" herein). For example, DISPLAY_BLANK may have a duration of 450 µs to 550 µs, less than 600 µs, less than 500 µs, greater than 450 µs, or any other desired duration.

An ambient light sensor, such as ALS 40, may be activated to make a measurement of ambient light (i.e., be "ON" in FIG. 9), during time T at periods 95. As shown in FIG. 9, time T may be less than the DISPLAY_BLANK duration. For example, ALS 40 may be on (i.e., integrate) for 450 µs, less than 500 µs, 400 µs or less, or any other time T. Before and after time T, ALS 40 may be on "hold" or in an idle state (i.e., ALS 40 may not be generating ambient light measurements during this time). In this way, ALS 40 may integrate while display 14 is blanked, thereby reducing interference from the light emitted by display 14.

The short integration time of ALS 40 may allow for the discarding of ambient light sensor measurements, if desired (e.g., when RF signals are detected by channel 81), without the loss of a substantial amount of ALS sensor measurements. For example, if one of the ALS measurements 95 in FIG. 9 occurs at the same time as RF signals are detected, processing circuitry or control circuitry, such as MCU 90, may discard that ALS measurement. However, in the FIG. 9 example, there would still be six ambient light measurements that are not discarded. In this way, control circuitry in device 10 may discard compromised ALS measurements, while maintaining sufficient ALS data to make corresponding adjustments to components within device 10.

In addition to making ambient light measurements 95, the ambient light sensor may also make RF signal measurements 93. RF signal measurements 93 may occur during times in which the display is activated (e.g., "ON" in FIG. 9). For example, it may be undesirable to make ambient light measurements when the display is on, as the display light may interfere with the light measurements. Therefore, any dual ambient light sensing and RF sensing channels in the ambient light sensor may be switched into an RF sensing mode and may make RF measurements while the display is on. In this way, the dual channels of the ambient light sensor may be switched between making ambient light measurements and RF measurements based on the operation of the display.

Although FIG. 9 shows RF sensing 93 occurring every time the display is on, this is merely illustrative. If desired, RF sensing 93 may occur less often, or may occur with adjustable frequency. For example, if a system or device has a low RF risk, RF sensing 93 may occur less often or be adjustable to occur less often.

Additionally, although FIG. 9 only shows RF sensing 93 when the display is on, RF sensing 93 may occur when the display is off, if desired. Moreover, RF sensing 93 may occur at any desired time. For example, a dual ambient light sensing and RF sensing channel may operate in an RF sensing mode while the other channels are measuring ambient light.

Figure 10:
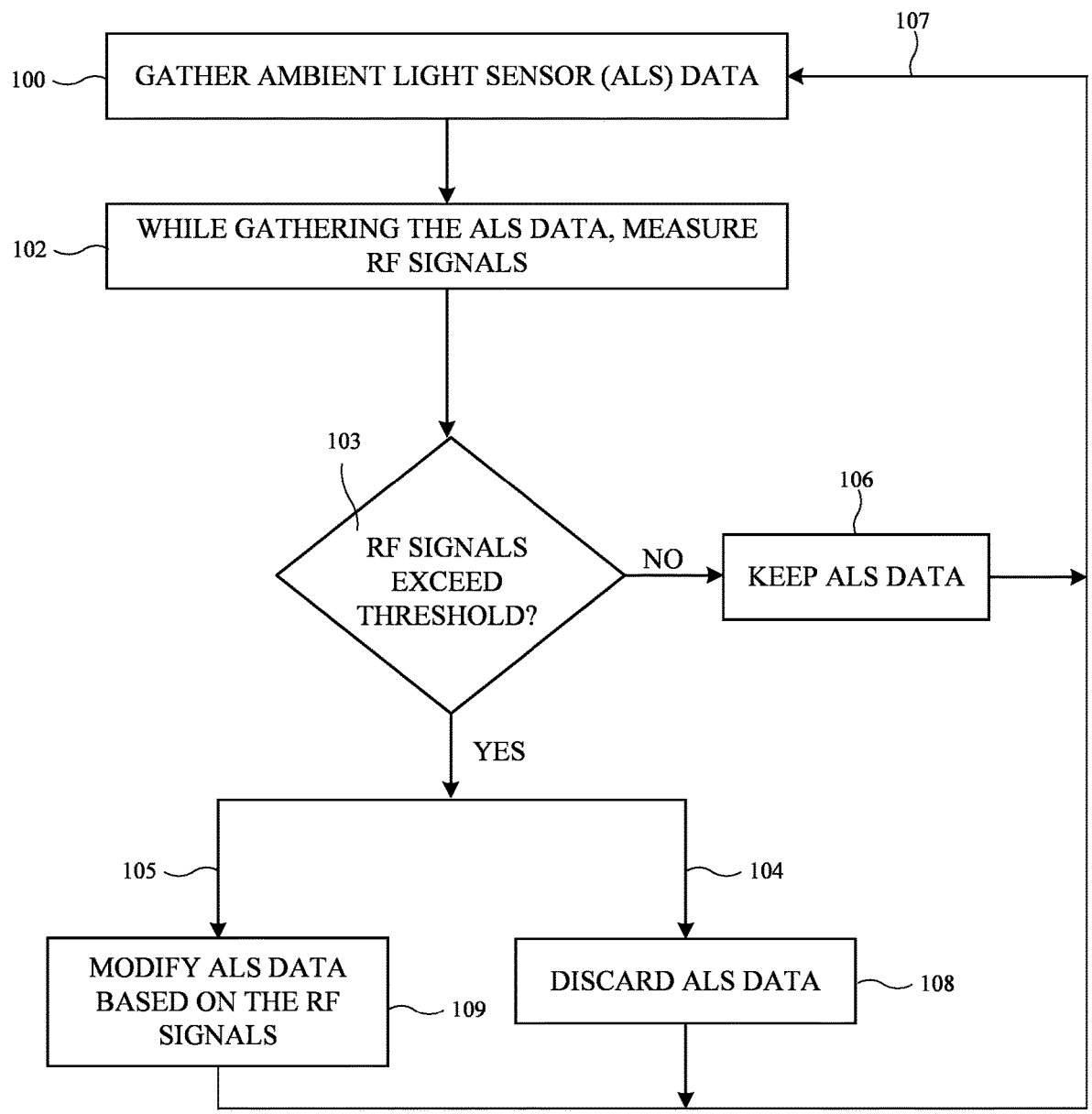
FIG. 10 is a flowchart of illustrative steps of gathering ambient light sensor data and measuring electromagnetic interference to determine which of the ambient light sensor data to discard in accordance with an embodiment.

A method of operating an ambient light sensor, such as ALS 40, and RF circuitry, such as RF circuitry 41, 91, or 81, is shown in FIG. 10. First, at step 100, the ambient light sensor may be used to gather ambient light sensor data (also referred to as ambient light measurements herein). The ambient light sensor measurement may be made with one or more ambient light senor channels. For example, the ambient light sensor may have multiple channels, each of which is sensitive to a different wavelength of light.

At step 102, which may occur at substantially the same time as step 100, RF signals may be measured using the RF circuitry. The RF circuitry may either be a channel within the ambient light sensor that has been modified to be sensitive to RF signals, may be a dual ambient light sensing and RF sensing channel that is configured to measure RF signals, may be an antenna, or may be other internal circuitry within device 10, as examples.

At step 103, either a threshold device, such as threshold device 89 of FIG. 5B or threshold device 94 of FIG. 6, or control circuitry, such as MCU 90 in FIG. 5A, may determine whether the RF signals detected by the RF circuitry exceed a threshold. The threshold may be set during manufacturing and/or be updated in the device's software or firmware as desired.

If the RF signals do not exceed the threshold, at step 106, the processing or control circuitry may keep the ambient light sensor data. The ambient light sensor data may then be used by control circuitry, such as control circuitry 16, to make adjustments to device 10, if desired.

If the RF signals exceed the threshold, the process may proceed along one of two paths to take a corrective action on the ambient light sensor data. First, the process may proceed along path 104 to step 108, at which the processing or control circuitry may discard the ambient light sensor data that was generated. In this way, ambient light sensor measurements that were affected by electromagnetic interference due to RF signals may be discarded.

Alternatively, the process may proceed along path 105 to step 109, at which the processing or control circuitry may modify the ambient light sensor data based on the RF signals. In particular, the RF signals may indicate the extent to which the ambient light sensor data has been rendered inaccurate. In other words, the amount of RF interference present when the ambient light sensor measurements were made may be proportional or otherwise related to the amount by which the measurements are inaccurate. Therefore, if desired, the processing or control circuitry may correct the ambient light sensor data based on the RF signals. In this way, corrected ambient light sensor measurements may be produced, which may then be used by control circuitry, such as control circuitry 16, to make changes to device 10, if desired.

The process may then proceed along line 107 back to step 100, where the ambient light sensor may make its next ambient light sensor measurement.

Figure 11:
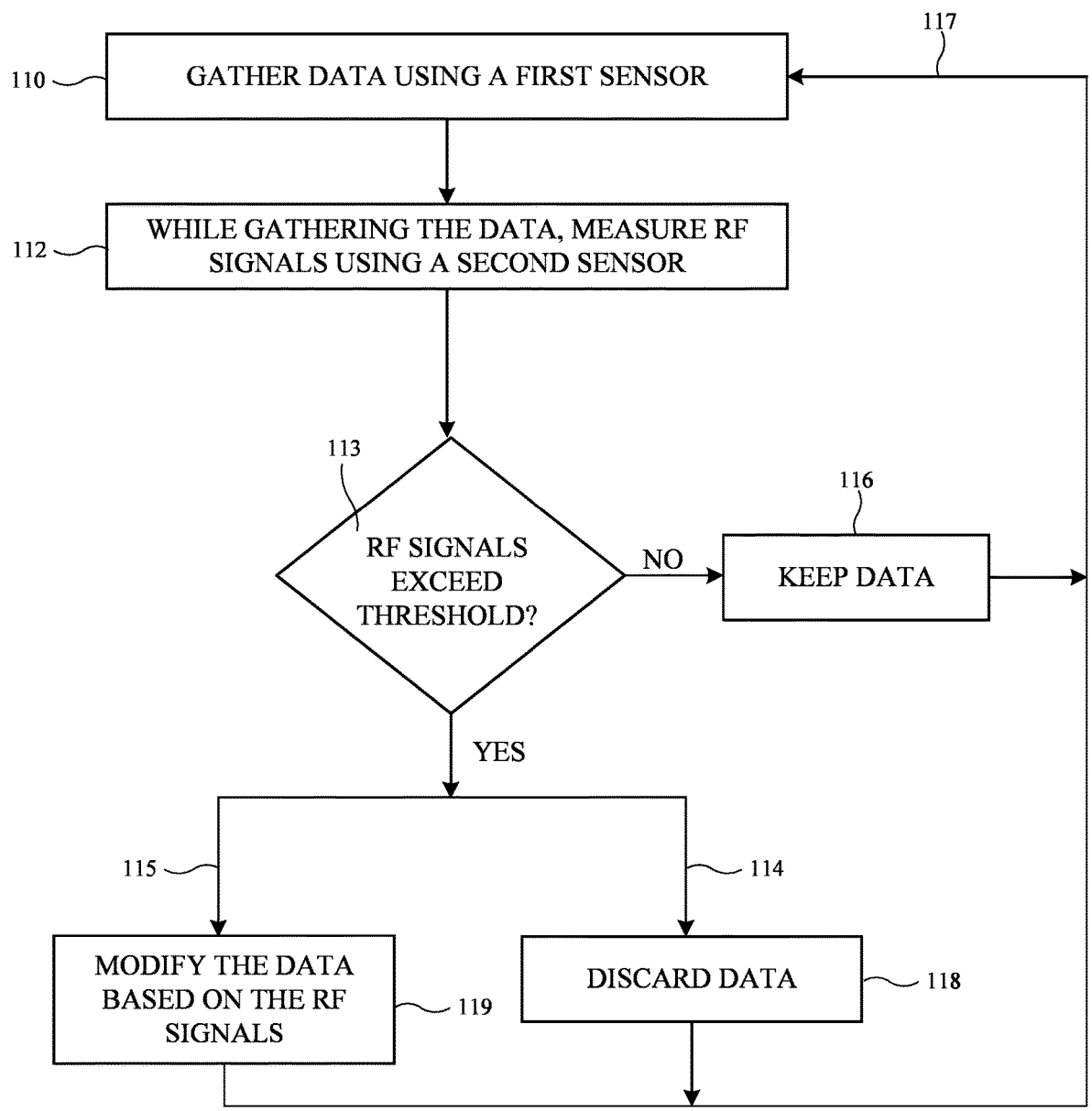
FIG. 11 is a flowchart of illustrative steps of gathering data and measuring electromagnetic interference to determine which of the data to discard in accordance with an embodiment.

Although the method of FIG. 10 is described as being used in conjunction with an ambient light sensor and RF circuitry, this is merely illustrative. As shown in FIG. 11, the method may be used with any two sensors.

At step 110, a first sensor may be used to gather data or make a measurement. The first sensor may be a motion sensor, a pulse sensor, a blood oxygen sensor, a light detection and ranging (LIDAR) sensor, a hall-effect sensor, or any other desired sensor.

At step 112, which may occur at substantially the same time as step 110, RF signals may be measured using a second sensor. The second sensor may be an antenna, a modified channel of the first sensor, or any other desired sensor that is capable of measuring RF signals.

At step 113, control circuitry (or a threshold device similar to threshold device 89 of FIG. 5B or threshold device 94 of FIG. 6) may determine whether the measured RF signals exceed a threshold. The threshold may be set during manufacturing and/or be updated in the device's software or firmware as desired, and may be dependent upon the sensitivity of the first sensor to EMI.

If the RF signals do not exceed the threshold, at step 116, the processing or control circuitry may keep first sensor data that was generated while the RF signals were present. The first data may then be used by control circuitry, such as control circuitry 16, to make adjustments to device 10, or may be used for any other desired function.

If the RF signals exceed the threshold, the process may proceed along one of two paths to take a corrective action on the first sensor data. First, the process may proceed along path 114 to step 118, at which the processing or control circuitry may discard the first sensor data that was generated. In this way, first sensor measurements that were affected by electromagnetic interference due to RF signals may be discarded.

Alternatively, the process may proceed along path 115 to step 119, at which the processing or control circuitry may modify the first sensor data based on the RF signals. In particular, the RF signals may indicate the extent to which the first sensor data has been rendered inaccurate. In other words, the amount of RF interference present when first sensor measurements were made may be proportional or otherwise related to the amount by which the measurements are inaccurate. Therefore, if desired, the processing or control circuitry may correct the first sensor data based on the RF signals. In this way, corrected first sensor data may be produced, which may then be used by control circuitry, such as control circuitry 16, to make changes to device 10, or may be used for any other desired function.

The process may then proceed along line 117 back to step 100, where the first sensor may make its next measurement.

The foregoing is merely illustrative and various modifications can be made to the described embodiments. The foregoing embodiments may be implemented individually or in any combination.

What is claimed is:

1. An electronic device, comprising:
   an ambient light sensor, comprising:
      at least one photosensitive channel that generates ambient light measurements in response to light incident on the at least one photosensitive channel, and
      radio-frequency measurement circuitry that generates radio-frequency measurements in response to electromagnetic interference while the at least one photosensitive channel is generating the ambient light measurements; and
   control circuitry configured to determine whether the radio-frequency measurements exceed a threshold and to take a corrective action when the radio-frequency measurements exceed the threshold.

2. The electronic device defined in claim 1 wherein the at least one photosensitive channel comprises a first photodetector, the radio-frequency measurement circuitry comprises a second photodetector, and the second photodetector is configured to detect the electromagnetic interference.

3. The electronic device defined in claim 2 wherein the radio-frequency measurement circuitry further comprises metal that covers the second photodetector.

4. The electronic device defined in claim 2 wherein the radio-frequency measurement circuitry further comprises a filter that covers the second photodetector.

5. The electronic device defined in claim 1 wherein the at least one photosensitive channel comprises a photodetector and wherein the radio-frequency measurement circuitry comprises an antenna that detects the electromagnetic interference.

6. The electronic device defined in claim 1 further comprising:
   a display configured to display images, wherein the display is blanked at intervals between the images and wherein the display overlaps the ambient light sensor.

7. The electronic device defined in claim 6 wherein the ambient light sensor is configured to generate the ambient light measurements and the radio-frequency measurements while the display is blanked.

8. The electronic device defined in claim 7 wherein each ambient light sensor measurement is generated during a time period of less than 500 μs.

9. The electronic device defined in claim 1 further comprising:
   a display configured to display images, wherein the display is blanked at intervals between the images, and wherein the ambient light sensor is configured to generate the ambient light measurements and the radio-frequency measurements over a first time period that exceeds the intervals between the images.

10. The electronic device defined in claim 9 wherein the ambient light sensor is configured to be adjusted to generate the ambient light measurements and the radio-frequency measurements over a second time period that is less than the intervals between the images in response to a given one of the radio-frequency measurements exceeding the threshold.

11. The electronic device defined in claim 1 wherein the corrective action comprises discarding the ambient light measurements generated when the radio-frequency measurements exceed the threshold.

12. The electronic device defined in claim 1 wherein the corrective action comprises correcting the ambient light measurements based on an amount by which the radio-frequency measurements exceed the threshold.

13. A method of operating an electronic device having a display and an ambient light sensor, the method comprising:
   using a photodetector in the ambient light sensor to produce ambient light measurements;
   while using the photodetector to produce the ambient light measurements, detecting electromagnetic interference with a radio-frequency measurement circuit;
   determining whether the electromagnetic interference exceeds a threshold; and
   in response to determining that the electromagnetic interference exceeds the threshold, taking a corrective action for the ambient light measurements that were generated while the electromagnetic interference exceeded the threshold.

14. The method defined in claim 13 further comprising:
   during a non-blanking time, activating at least some pixel rows in the display overlapping the ambient light sensor to emit light; and
   during a blanking time, deactivating the at least some pixel rows in the display overlapping the ambient light sensor.

15. The method defined in claim 14 wherein using the photodetector in the ambient light sensor to produce the ambient light measurements comprises using the photodetector during the blanking time.

16. The method defined in claim 13 wherein taking the corrective action comprises discarding the ambient light measurements that were generated while the electromagnetic interference exceeded the threshold.

17. The method defined in claim 13 wherein taking the corrective action comprises correcting the ambient light measurements based on an amount by which the electromagnetic interference exceeded the threshold.

18. An electronic device, comprising:
   an ambient light sensor comprising at least one photodetector, wherein the ambient light sensor is configured to generate an ambient light measurement in response to incident light;
   a radio-frequency measurement circuit that is configured to measure electromagnetic interference while the ambient light sensor generates the ambient light measurement; and
   control circuitry that is configured to discard the ambient light measurement in response to the electromagnetic interference exceeding a threshold.

19. The electronic device of claim 18 wherein the radio-frequency measurement circuit comprises at least one additional photodetector overlapped by a layer.

20. The electronic device defined in claim 19 wherein the layer is selected from the group consisting of: a metal layer, a filter layer, and an ink layer.

21. The electronic device defined in claim 19 wherein each photodetector forms a channel of the ambient light sensor that generates first signals in response to ambient light and wherein each additional photodetector forms an additional channel of the ambient light sensor that generates second signals in response to electromagnetic interference.

22. The electronic device defined in claim 18 wherein the radio-frequency measurement circuit comprises an antenna.

23. The electronic device defined in claim 18 wherein the radio-frequency measurement circuit is a dual ambient light sensing and radio-frequency measurement circuit.

24. The electronic device defined in claim 23 wherein the dual ambient light sensing and radio-frequency measurement circuit comprises first and second switches, and wherein the control circuitry is configured to modulate the first and second switches to switch the dual ambient light sensing and radio-frequency measurement circuit between an ambient light sensing mode and a radio-frequency measurement mode.

\* \* \* \* \*